United States Patent
Kang

(10) Patent No.: US 12,461,552 B2
(45) Date of Patent: Nov. 4, 2025

(54) CLOCK DISTRIBUTION NETWORK, AND SEMICONDUCTOR DEVICE AND SEMICONDUCTOR SYSTEM INCLUDING THE CLOCK DISTRIBUTION NETWORK

(71) Applicant: SK hynix Inc., Icheon-si (KR)

(72) Inventor: Ji Hyo Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 231 days.

(21) Appl. No.: 18/320,701

(22) Filed: May 19, 2023

(65) Prior Publication Data

US 2024/0192722 A1 Jun. 13, 2024

(30) Foreign Application Priority Data

Dec. 9, 2022 (KR) .......................... 10-2022-0171442

(51) Int. Cl.
| | | |
|---|---|---|
| *G06F 1/10* | (2006.01) | |
| *G06F 1/06* | (2006.01) | |
| *G06F 1/08* | (2006.01) | |
| *G06F 1/12* | (2006.01) | |

(52) U.S. Cl.
CPC .................. *G06F 1/10* (2013.01); *G06F 1/06* (2013.01); *G06F 1/08* (2013.01); *G06F 1/12* (2013.01)

(58) Field of Classification Search
CPC ..... G06F 1/10; G06F 1/08; G06F 1/12; G06F 1/06
See application file for complete search history.

(56) References Cited

U.S. PATENT DOCUMENTS

| | | | |
|---|---|---|---|
| 10,984,844 B2 | 4/2021 | Lee et al. | |
| 11,233,500 B1* | 1/2022 | Kang | H03K 3/037 |
| 2013/0214816 A1* | 8/2013 | Thornton | H03K 19/096 |
| | | | 326/93 |
| 2020/0211618 A1* | 7/2020 | Kwak | G11C 7/1093 |
| 2020/0379680 A1* | 12/2020 | Kim | G06F 3/0679 |
| 2022/0069825 A1* | 3/2022 | Kim | H03K 21/10 |
| 2022/0155814 A1 | 5/2022 | Kang et al. | |
| 2023/0082056 A1* | 3/2023 | Han | G06F 1/10 |
| 2023/0213961 A1 | 7/2023 | Kang et al. | |
| 2023/0350452 A1* | 11/2023 | Han | G06F 1/06 |

FOREIGN PATENT DOCUMENTS

| | | |
|---|---|---|
| KR | 101499176 B1 | 3/2015 |
| KR | 101944964 B1 | 2/2019 |
| KR | 1020200137738 A | 12/2020 |

* cited by examiner

*Primary Examiner* — Glenn A. Auve
(74) *Attorney, Agent, or Firm* — WILLIAM PARK AND ASSOCIATES LTD.

(57) ABSTRACT

A clock distribution network includes a global clock generation circuit and a data clock generation circuit. The global clock generation circuit generates a first group of division clock signals by dividing a system clock signal, and generates a second group of division clock signals by dividing the first group of division clock signals. The data clock generation circuit generates a first group of data clock signals based on the system clock signal and at least some of the first group of division clock signals, and generates a second group of data clock signals based on at least some of the first group of data clock signals and at least some of the second group of division clock signals.

18 Claims, 10 Drawing Sheets

CLOCK DISTRIBUTION NETWORK, AND SEMICONDUCTOR DEVICE AND SEMICONDUCTOR SYSTEM INCLUDING THE CLOCK DISTRIBUTION NETWORK

CROSS-REFERENCES TO RELATED APPLICATION

The present application claims priority under 35 U.S.C. § 119(a) to Korean application number 10-2022-0171442, filed on Dec. 9, 2022, in the Korean Intellectual Property Office, which is incorporated herein by reference in its entirety.

BACKGROUND

1. Technical Field

The present invention generally relates to an integrated circuit technology, and more particularly, to a clock distribution network, and a semiconductor device and a semiconductor system including the clock distribution network.

2. Related Art

Electronic devices include many electronic components. Among the electronic devices, a computer system may include many semiconductor devices made of semiconductor materials. The semiconductor devices that constitute the computer system may communicate with each other by transmitting and/or receiving a system clock signal, a command address signal, and data. The semiconductor devices may synchronize the command address signal and the data with the system clock signal. A frequency with which the command address signal is synchronized and a frequency with which the data is synchronized may be different from each other depending on an application. Accordingly, the semiconductor device may include a clock generation circuit and/or a clock distribution network for generating an internal clock signal having various frequency bands from a system clock signal.

SUMMARY

In an embodiment, a clock distribution network may include a global clock generation circuit, and a data clock generation circuit. The global clock generation circuit may be configured to divide a system clock signal to generate a first group of division clock signals, and to divide at least some of the first group of division clock signals to generate a second group of division clock signals. The data clock generation circuit may be configured to generate a first group of data clock signals based on at least some of the first group of division clock signals and the system clock signal and to generate a second group of data clock signals based on at least some of the second group of division clock signals and at least some of the first group of data clock signals.

In an embodiment, a semiconductor device may include a global clock generation circuit, a command address reception circuit, and a data clock generation circuit. The global clock generation circuit may be configured to divide a system clock signal to generate a first group of division clock signals, and to divide at least some of the first group of division clock signals to generate a second group of division clock signals. The command address reception circuit may be configured to receive a command address signal and to latch the command address signal based on a command clock signal that is generated based on the second group of division clock signals. The data clock generation circuit may be configured to generate a first group of data clock signals based on at least some of the first group of division clock signals and the system clock signal, and to generate a second group of data clock signals based on at least some of the second group of division clock signals and at least some of the first group of data clock signals.

In an embodiment, a semiconductor device may include a clock distribution network. The clock distribution network may include a global clock generation circuit, a phase adjustment circuit, and a data clock generation circuit. The global clock generation circuit may be configured to divide a system clock signal to generate a first group of division clock signals, and to divide at least some of the first group of division clock signals to generate a second group of division clock signals. The phase adjustment circuit may be configured to generate one of the first group of division clock signals as a first reference clock signal and generate one of the second group of division clock signals as a second reference clock signal, by detecting phases of the second group of division clock signals. The data clock generation circuit may be configured to generate a first group of data clock signals based on the first reference clock signal and the system clock signal, and to generate a second group of data clock signals based on the second reference clock signal and at least some of the first group of data clock signals.

DETAILED DESCRIPTION

Hereinafter, embodiments will be described in more detail with reference to the accompanying drawings.

Figure 1:
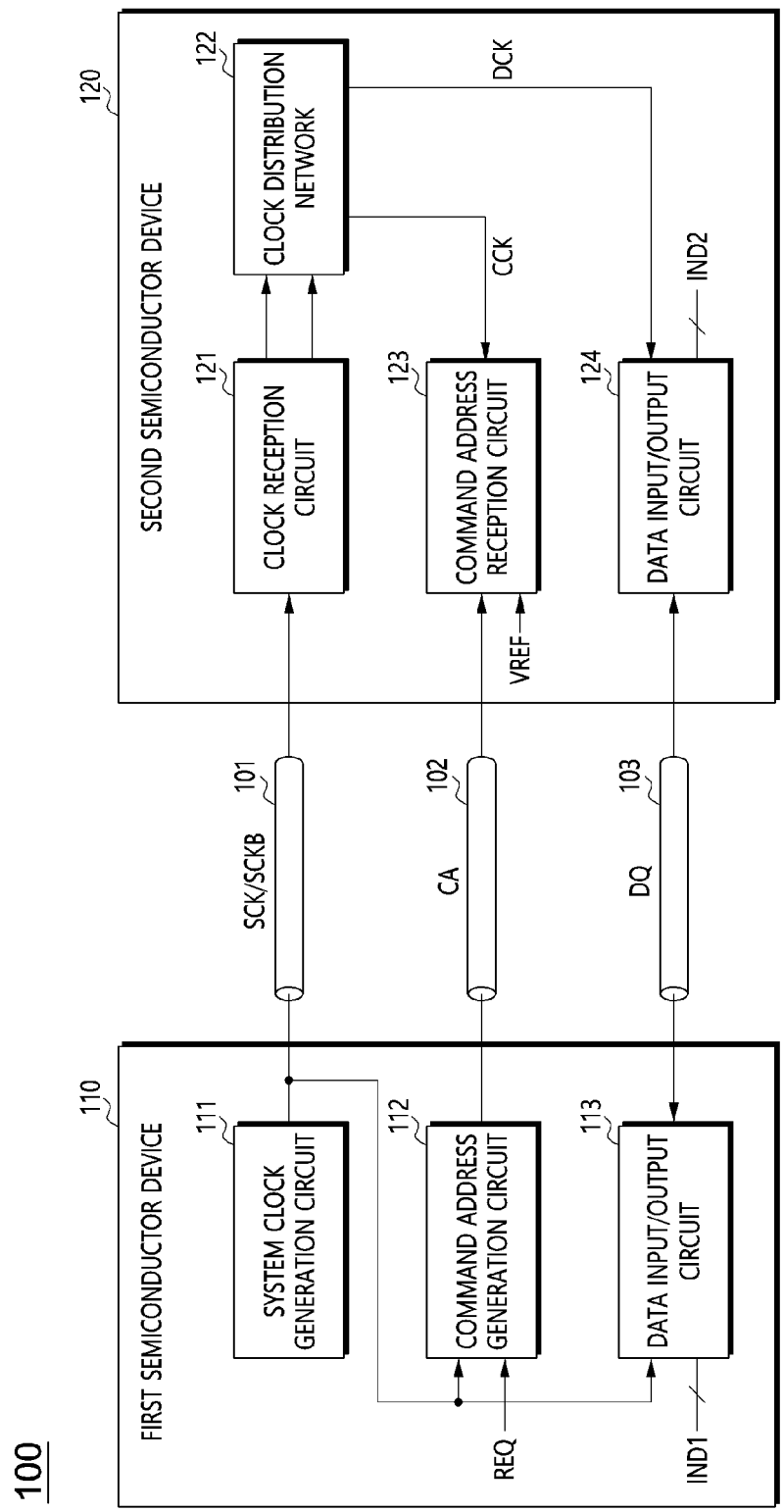
FIG. 1 is a diagram illustrating a configuration of a semiconductor system according to an embodiment.

FIG. 1 is a diagram illustrating a configuration of a semiconductor system 100 according to an embodiment. Referring to FIG. 1, the semiconductor system 100 may include a first semiconductor device 110 and a second semiconductor device 120. The first semiconductor device 110 may be a master device for controlling an operation of the second semiconductor device 110. The second semiconductor device 120 may be a slave device capable of performing various operations under the control of the first semiconductor device 110. The first semiconductor device 110 may provide various control signals that are necessary for the second semiconductor device 120 to operate. The first semiconductor device 110 may include various types of host devices. For example, the first semiconductor device 110 may be a host device, such as a central processing unit (CPU), a graphic processing unit (GPU), a multi-media processor (MMP), a digital signal processor, an application processor (AP), and a memory controller. The second semiconductor device 120 may be a memory device, for example. The memory device may include volatile memory and nonvolatile memory. The volatile memory may include static RAM (SRAM), dynamic RAM (DRAM), and synchronous DRAM (SDRAM). The nonvolatile memory may include read only memory (ROM), programmable ROM (PROM), electrically erasable PROM (EEPROM), electrically programmable ROM (EPROM), flash memory, phase change RAM (PRAM), magnetic RAM (MRAM), resistive RAM (RRAM), and ferroelectric RAM (FRAM).

The second semiconductor device 120 may be coupled to the first semiconductor device 110 through a plurality of buses. The plurality of buses may be a signal transmission path, link, or channel for transmitting a signal. The plurality of buses may include a clock bus 101, a command address bus 102, and a data bus 103. The clock bus 101 and the command address bus 102 may be a unidirectional bus from the first semiconductor device 110 to the second semiconductor device 120. The data bus 103 may be a bidirectional bus. The second semiconductor device 120 may be coupled to the first semiconductor device 110 through the clock bus 101, and may receive a system clock signal SCK from the first semiconductor device 110. The system clock signal SCK is a differential signal along with a complementary signal SCKB, and may be transmitted through the clock bus 101. The second semiconductor device 120 may be coupled to the first semiconductor device 110 through the command address bus 102, and may receive a command address signal CA from the first semiconductor device 110. The command address signal CA may include a plurality of signal sets including a plurality of bits. The second semiconductor device 120 may receive the command address signal CA based on the system clock signal SCK. The second semiconductor device 120 may be coupled to the first semiconductor device 110 through the data bus 103, and may receive data DQ from the first semiconductor device 110 or may transmit the data DQ to the first semiconductor device 110.

The first semiconductor device 110 may include a system clock generation circuit 111, a command address generation circuit 112, and a data input/output circuit 113. The system clock generation circuit 111 may generate the system clock signal SCK and the complementary signal SCKB. The system clock generation circuit 111 may include any clock generator for generating the system clock signal SCK. For example, the system clock generation circuit may include an oscillator, a phase-locked loop circuit, or a delay-locked loop circuit. The system clock generation circuit 111 may generate the system clock signal SCK having a frequency that is suitable for the first and second semiconductor devices 110 and 120 to communicate with each other. The system clock generation circuit 111 may transmit the system clock signal SCK and the complementary signal SCKB to the second semiconductor device 120 through the clock bus 101. The system clock generation circuit 111 may provide the system clock signal SCK and the complementary signal SCKB to at least one of the command address generation circuit 112 and the data input/output circuit 113.

The command address generation circuit 112 may generate the command address signal CA based on a request REQ. The command address generation circuit 112 may generate the command address signal CA that instructs the second semiconductor device 120 to perform various operations in response to the request REQ. The command address generation circuit 112 may transmit the command address signal CA to the second semiconductor device 120 through the command address bus 102. The command address generation circuit 112 may receive the system clock signal SCK, and may transmit the command address signal CA to the command address bus 102 in synchronization with the system clock signal SCK.

The data input/output circuit 113 may be coupled to the second semiconductor device 120 through the data bus 103, and may transmit the data DQ to the second semiconductor device 120 through the data bus 103 or may receive the data DQ that is transmitted by the second semiconductor device 120 through the data bus 103. The data input/output circuit 113 may receive the system clock signal SCK, and may perform a data input/output operation in synchronization with the system clock signal SCK. The data input/output circuit 113 may transmit internal data IND1 of the first semiconductor device 110 as the data DQ in synchronization with the system clock signal SCK. The data input/output circuit 113 may receive the data DQ that is transmitted by the second semiconductor device 120, in synchronization with the system clock signal SCK, and may generate the internal data IND1 of the first semiconductor device 110 based on the received data.

The second semiconductor device 120 may include a clock reception circuit 121, a clock distribution network 122, a command address reception circuit 123, and a data input/output circuit 124. The clock reception circuit 121 may be coupled to the clock bus 101, and may receive the system clock signal SCK that is transmitted by the first semiconductor device 110 through the clock bus 101. The clock reception circuit 121 may receive the system clock signal SCK by differentially amplifying the system clock signal SCK and the complementary signal SCKB. The system clock signal SCK that is received by the clock reception circuit 121 and the complementary signal SCKB may be provided to the clock distribution network 122.

The clock distribution network 122 may be coupled to the clock reception circuit 121, and may receive the system clock signal SCK and the complementary signal SCKB from the clock reception circuit 121. In an embodiment, the clock reception circuit 121 may be integrated into the clock distribution network 122. The clock distribution network 122 may generate a plurality of internal clock signals based on the system clock signal SCK and the complementary signal SCKB. The plurality of internal clock signals may include a command clock signal CCK and a data clock signal DCK. The clock distribution network 122 may distribute the plurality of internal clock signals to the internal circuits of the second semiconductor device 120. The clock distribution network 122 may provide the command clock signal CCK to the command address reception circuit 123, and may provide the data clock signal DCK to the data input/output circuit 124. The data clock signal DCK may have a higher frequency than the command clock signal CCK. The clock distribution network 122 may include a frequency divider, such as a clock divider, in order to generate the plurality of internal clock signals having different frequencies from the system clock signal pair SCK and SCKB. The clock distribution network 122 may include a plurality of clock generation circuits for distributing the plurality of internal clock signals.

The command address reception circuit 123 may be coupled to the command address bus 102, and may receive the command address signal CA that is transmitted by the first semiconductor device 110 through the command address bus 120. The command address reception circuit 123 may receive a reference voltage VREF, and may receive the command address signal CA by differentially amplifying the command address signal CA and the reference voltage VREF. The command address reception circuit 123 may receive the command clock signal CCK from the clock distribution network 122. The command address reception circuit 123 may synchronize the received command address signal with the command clock signal CCK by latching the received command address signal CA in synchronization with the command clock signal CCK.

The data input/output circuit 124 may be coupled to the first semiconductor device 110 through the data bus 103, and may transmit the data DQ to the first semiconductor device 110 through the data bus 103 or may receive the data DQ that is transmitted by the first semiconductor device 110 through the data bus 103. The data input/output circuit 124 may receive the data clock signal DCK from the clock distribution network 122, and may perform a data input/output operation in synchronization with the data clock signal DCK. The data input/output circuit 124 may transmit internal data IND2 of the second semiconductor device 120 as the data DQ in synchronization with the data clock signal DCK. The data input/output circuit 124 may receive the data DQ that is transmitted by the first semiconductor device 110, in synchronization with the data clock signal DCK, and may generate the internal data IND2 of the second semiconductor device 120 based on the received data.

Figure 2:
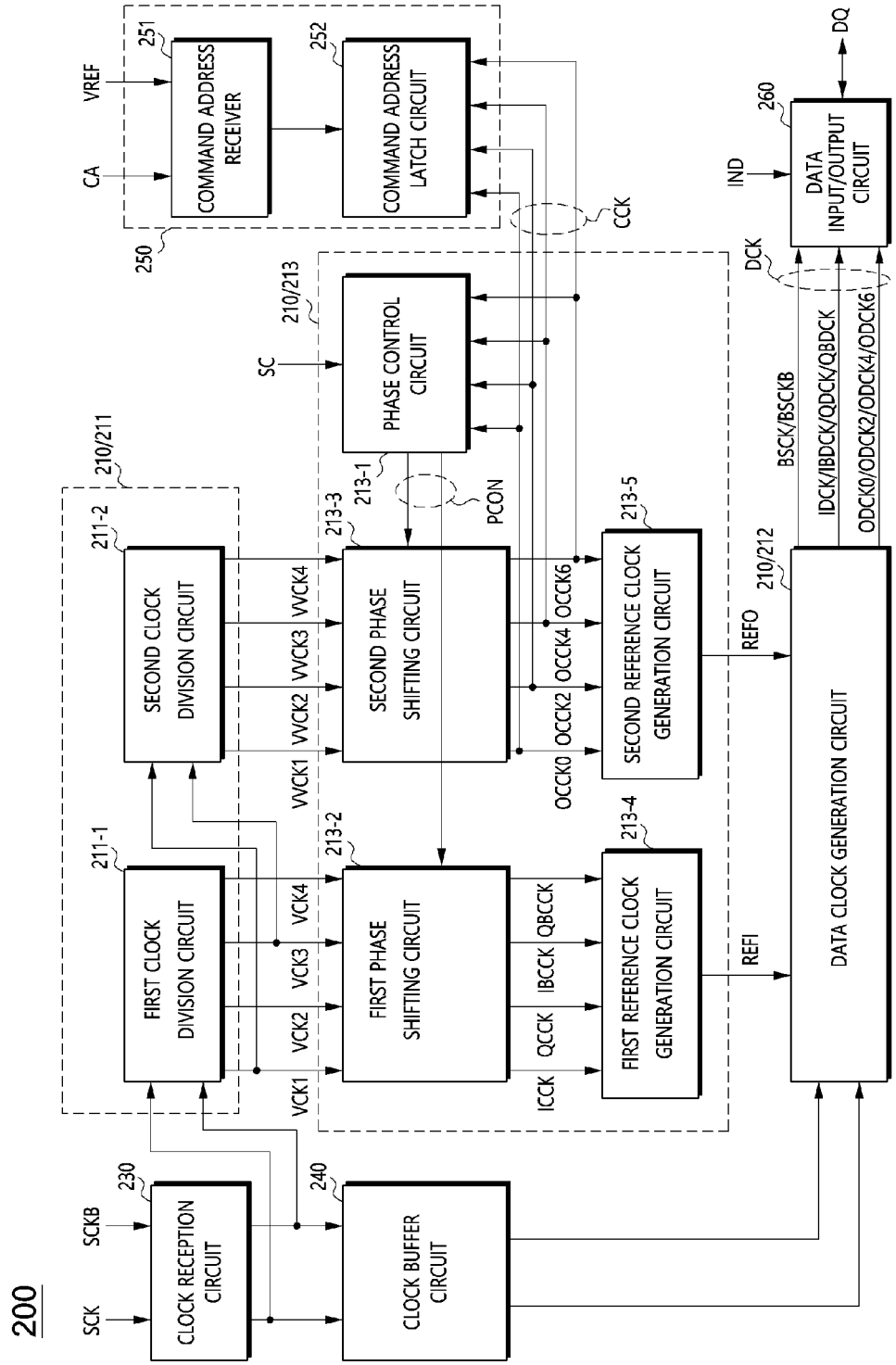
FIG. 2 is a diagram illustrating a configuration of a semiconductor device including a clock distribution network according to an embodiment.

FIG. 2 is a diagram illustrating a configuration of a semiconductor device 200 according to an embodiment. The semiconductor device 200 may be applied as the second semiconductor device 120 illustrated in FIG. 1. The semiconductor device 200 may include a clock distribution network 210. The clock distribution network 210 may generate a plurality of internal clock signals by receiving a system clock signal SCK. The clock distribution network 210 may generate the plurality of internal clock signals having different frequencies from the system clock signal SCK. For example, the plurality of internal clock signals may include a command clock signal CCK and a data clock signal DCK. The clock distribution network 210 may generate the command clock signal and the data clock signal based on the system clock signal SCK, and may distribute the command clock signal CCK and the data clock signal DCK to internal circuits of the semiconductor device 200.

The clock distribution network 210 may include a global clock generation circuit 211 and a data clock generation circuit 212. The global clock generation circuit 211 may receive the system clock signal SCK, and may generate a first group of division clock signals VCK1, VCK2, VCK3, and VCK4 and a second group of division clock signals VVCK1, VVCK2, VVCK3, and VVCK4 based on the system clock signal SCK. The global clock generation circuit 211 may generate the first group of division clock signals VCK1, VCK2, VCK3, and VCK4 by dividing the system clock signal SCK, and may generate the second group of division clock signals VVCK1, VVCK2, VVCK3, and VVCK4 by dividing at least some of the first group of division clock signals VCK1, VCK2, VCK3, and VCK4. For example, each of the frequencies of the first group of division clock signals VCK1, VCK2, VCK3, and VCK4 may be half of the frequency of the system clock signal SCK. Each of the frequencies of the second group of division clock signals VVCK1, VVCK2, VVCK3, and VVCK4 may be half of each of the frequencies of the first group of division clock signals VCK1, VCK2, VCK3, and VCK4, and may be ¼ of the frequency of the system clock signal SCK. The first group of division clock signals may include a first division clock signal VCK1, a second division clock signal VCK2, a third division clock signal VCK3, and a fourth division clock signal VCK4. The first to fourth division clock signals VCK1, VCK2, VCK3, and VCK4 may sequentially have a phase difference of 90 degrees between the first to fourth division clock signals. The second group of division clock signals may include a fifth division clock signal VVCK1, a sixth division clock signal VVCK2, a seventh division clock signal VVCK3, and an eighth division clock signal VVCK4. The fifth to eighth division clock signals VVCK1, VVCK2, VVCK3, and VVCK4 may sequentially have a phase difference of 90 degrees between the fifth to eighth division clock signals. Ideally, a rising edge of the first division clock signal VCK1 and a rising edge of the fifth division clock signal VVCK1 may be synchronized with a rising edge of the system clock signal SCK having the same turn.

The global clock generation circuit 211 may include a first clock division circuit 211-1 and a second clock division circuit 211-2. The first clock division circuit 211-1 may receive the system clock signal SCK and a complementary signal SCKB, and may generate the first group of division clock signals VCK1, VCK2, VCK3, and VCK4 by dividing the frequencies of the system clock signal SCK and the complementary signal SCKB. The second clock division circuit 211-2 may receive at least some of the first group of division clock signals VCK1, VCK2, VCK3, and VCK4. For example, the second clock division circuit 211-2 may receive the first division clock signal VCK1 and the third division clock signal VCK3, among the first group of division clock signals. The second clock division circuit 211-2 may generate the second group of division clock signals VVCK1, VVCK2, VVCK3, and VVCK4 by dividing the frequencies of the first and third division clock signals VCK1 and VCK3. Any clock divider capable of generating clock signals having divided frequencies may be applied as the first and second clock division circuits 211-1 and 211-2. In an embodiment, the second clock division circuit 211-2 may generate the second group of division clock signals VVCK1, VVCK2, VVCK3, and VVCK4 by dividing the frequencies of the second and fourth division clock signals VCK2 and VCK4 instead of the first and third division clock signals VCK1 and VCK3.

The data clock generation circuit 212 may receive the system clock signal SCK, at least some of the first group of division clock signals VCK1, VCK2, VCK3, and VCK4, and at least some of the second group of division clock signals VVCK1, VVCK2, VVCK3, and VVCK4. The data clock generation circuit 212 may generate the data clock signal DCK, based on the system clock signal SCK, at least some of the first group of division clock signals VCK1, VCK2, VCK3, and VCK4, and at least some of the second group of division clock signals VVCK1, VVCK2, VVCK3, and VVCK4. The data clock signal DCK may include a plurality of groups of data clock signals. For example, the data clock signal DCK may include a buffered system clock signal pair BSCK and BSCKB, a first group of data clock signals IDCK, QDCK, IBDCK, and QBDCK, and a second group of data clock signals ODCK0, ODCK2, ODCK4, and ODCK6. The data clock generation circuit 212 may generate the buffered system clock signal pair BSCK and BSCKB by buffering the system clock signal pair SCK and SCKB. The buffered system clock signal pair BSCK and BSCKB may have substantially the same characteristics as the system clock signal pair SCK and SCKB. The data clock generation circuit 212 may generate the first group of data clock signals IDCK, QDCK, IBDCK, and QBDCK, based on at least some of the first group of division clock signals VCK1, VCK2, VCK3, and VCK4 and the system clock signal pair SCK and SCKB. The data clock generation circuit 212 may generate the second group of data clock signals ODCK0, ODCK2, ODCK4, and ODCK6, based on at least some of the second group of division clock signals VVCK1, VVCK2, VVCK3, and VVCK4 and at least some of the first group of data clock signals IDCK, QDCK, IBDCK, and QBDCK. The first group of data clock signals IDCK, QDCK, IBDCK, and QBDCK may have a lower frequency than the system clock signal SCK and/or the buffered system clock signal BSCK. The second group of data clock signals ODCK0, ODCK2, ODCK4, and ODCK6 may have a lower frequency than the first group of data clock signals IDCK, QDCK, IBDCK, and QBDCK.

The clock distribution network 210 may further include a phase adjustment circuit 213. The phase adjustment circuit 213 may receive the second group of division clock signals VVCK1, VVCK2, VVCK3, and VVCK4, and may detect the phases of the second group of division clock signals VVCK1, VVCK2, VVCK3, and VVCK4. The phase adjustment circuit 213 may selectively change the phases of the first group of division clock signals VCK1, VCK2, VCK3, and VCK4 and the phases of the second group of division clock signals VVCK1, VVCK2, VVCK3, and VVCK4, based on the results of the detection of the phases of the second group of division clock signals VVCK1, VVCK2, VVCK3, and VVCK4. The phase adjustment circuit 213 may generate a first reference clock signal REFI and a second reference clock signal REFO based on the results of the detection of the phases of the second group of division clock signals VVCK1, VVCK2, VVCK3, and VVCK4. The phase adjustment circuit 213 may generate one of the first group of division clock signals VCK1, VCK2, VCK3, and VCK4 as the first reference clock signal REFI, and may generate one of the second group of division clock signals VVCK1, VVCK2, VVCK3, and VVCK4 as the second reference clock signal REFO. At least some of the first group of division clock signals VCK1, VCK2, VCK3, and VCK4 that are received by the data clock generation circuit 212 may be the first reference clock signal REFI. At least some of the second group of division clock signals VVCK1, VVCK2, VVCK3, and VVCK4 that are received by the data clock generation circuit 212 may be the second reference clock signal REFO. The phase adjustment circuit 213 may generate the first reference clock signal REFI by inverting and/or swapping the phases of the first group of division clock signals VCK1, VCK2, VCK3, and VCK4 based on the results of the detection of the phases of the second group of division clock signals VVCK1, VVCK2, VVCK3, and VVCK4. The phase adjustment circuit 213 may generate the second reference clock signal REFO by inverting and/or swapping the phases of the second group of division clock signals VVCK1, VVCK2, VVCK3, and VVCK4 based on the results of the detection of the phases of the second group of division clock signals VVCK1, VVCK2, VVCK3, and VVCK4.

The phase adjustment circuit 213 may include a phase control circuit 213-1, a first phase shifting circuit 213-2, a second phase shifting circuit 213-3, a first reference clock generation circuit 213-4, and a second reference clock generation circuit 213-5. The phase control circuit 213-1 may receive the second group of division clock signals VVCK1, VVCK2, VVCK3, and VVCK4, and may detect the phases of the second group of division clock signals VVCK1, VVCK2, VVCK3, and VVCK4. The phase control circuit 213-1 may generate a phase control signal PCON by detecting the phases of the second group of division clock signals VVCK1, VVCK2, VVCK3, and VVCK4. The phase control signal PCON may be provided to the first phase shifting circuit 213-2 and the second phase shifting circuit 213-3. The phase control circuit 213-1 may receive a synchronization command signal SC, may detect a division clock signal the logic level of which transitions during the interval in which the synchronization command signal SC is enabled, among the second group of division clock signals VVCK1, VVCK2, VVCK3, and VVCK4, and may generate the phase control signal PCON based on the results of the detection. Functions and/or operations of the synchronization command signal SC and the phase control circuit 213-1 will be more specifically described later.

The first phase shifting circuit 213-2 may receive the first group of division clock signals VCK1, VCK2, VCK3, and VCK4 and the phase control signal PCON. The first phase shifting circuit 213-2 may generate a first group of synchronization clock signals ICCK, QCCK, IBCCK, and QBCCK by selectively inverting and/or swapping the phases of the first group of division clock signals VCK1, VCK2, VCK3, and VCK4 based on the phase control signal PCON. If the first phase shifting circuit 213-2 does not invert and/or swap the phases of the first group of division clock signals VCK1, VCK2, VCK3, and VCK4, the phases of the first group of synchronization clock signals ICCK, QCCK, IBCCK, and QBCCK may be substantially the same as the phases of the first group of division clock signals VCK1, VCK2, VCK3, and VCK4. Each of the frequencies of the first group of synchronization clock signals ICCK, QCCK, IBCCK, and QBCCK may be substantially the same as each of the frequencies of the first group of division clock signals VCK1, VCK2, VCK3, and VCK4.

The second phase shifting circuit 213-3 may receive the second group of division clock signals VVCK1, VVCK2, VVCK3, and VVCK4 and the phase control signal PCON. The second phase shifting circuit 213-3 may generate a second group of synchronization clock signals QCCK0, QCCK2, OCCK4, and OCCK6 by selectively inverting and/or swapping the phases of the second group of division clock signals VVCK1, VVCK2, VVCK3, and VVCK4 based on the phase control signal PCON. If the second phase shifting circuit 213-3 does not invert and/or swap the phases of the second group of division clock signals VVCK1, VVCK2, VVCK3, and VVCK4, the phases of the second group of synchronization clock signals OCCK0, OCCK2, OCCK4, and OCCK6 may be substantially the same as the phases of the second group of division clock signals VVCK1, VVCK2, VVCK3, and VVCK4. Each of the frequencies of the second group of synchronization clock signals OCCK0, OCKK2, OCCK4, and OCCK6 may be substantially the same as each of the frequencies of the second group of division clock signals VVCK1, VVCK2, VVCK3, and VVCK4. The phase control circuit 213 may receive the second group of synchronization clock signals OCCK0, OCCK2, OCCK4, and OCCK6 from the second phase shifting circuit 213-3 before the phase control signal PCON is generated. The phase control circuit 213 may generate the phase control signal PCON by detecting the phases of the second group of synchronization clock signals OCCK0, OCCK2, OCCK4, and OCCK6, which are substantially the same as the phases of the second group of division clock signals VVCK1, VVCK2, VVCK3, and VVCK4. The second phase shifting circuit 213-3 may provide the second group of synchronization clock signals OCCK0, OCCK2, OCCK4, and OCCK6 as the command clock signal CCK.

The first reference clock generation circuit 213-4 may receive the first group of synchronization clock signals ICCK, QCCK, IBCCK, and QBCCK, and may generate the first reference clock signal REFI from one of the first group of synchronization clock signals ICCK, QCCK, IBCCK, and QBCCK. The first group of synchronization clock signals may include a first synchronization clock signal ICCK, a second synchronization clock signal QCCK, a third synchronization clock signal IBCCK, and a fourth synchronization clock signal QBCCK. The first to fourth synchronization clock signals ICCK, QCCK, IBCCK, and QBCCK may sequentially have a phase difference of 90 degrees between the first to fourth synchronization clock signals. The first reference clock generation circuit 213-4 may output the first synchronization clock signal ICCK as the first reference clock signal REFI. The second reference clock generation circuit 213-5 may receive the second group of synchronization clock signals OCCK0, OCCK2, OCCK4, and OCCK6, and may generate the second reference clock signal REFO from one of the second group of synchronization clock signals OCCK0, OCCK2, OCCK4, and OCCK6. The second group of synchronization clock signals may include a fifth synchronization clock signal OCCK0, a sixth synchronization clock signal OCCK2, a seventh synchronization clock signal OCCK4, and an eighth synchronization clock signal OCCK6. The fifth to eighth synchronization clock signals OCCK0, OCCK2, OCCK4, and OCCK6 may sequentially have phase differences of 90 degrees between the fifth to eighth synchronization clock signals. The second reference clock generation circuit 213-5 may output the fifth synchronization clock signal OCCK0 as the second reference clock signal REFO.

The semiconductor device 200 may further include a clock reception circuit 230, a clock buffer circuit 240, a command address reception circuit 250 and a data input/output circuit 260. The clock reception circuit 230 may receive the system clock signal SCK and the complementary signal SCKB. For example, the clock reception circuit 230 may receive the system clock signal SCK and the complementary signal SCKB that are transmitted by the first semiconductor device 110 illustrated in FIG. 1. The clock reception circuit 230 may receive the system clock signal SCK and the complementary signal SCKB by differentially amplifying the system clock signal SCK and the complementary signal SCKB. The clock reception circuit 230 may provide the received system clock signal and the received complementary signal to the global clock generation circuit 211 and the clock buffer circuit 240. The first clock division circuit 211-1 of the global clock generation circuit 211 may receive the system clock signal SCK and the complementary signal SCKB from the clock reception circuit 230. The clock buffer circuit 240 may receive the system clock signal SCK and the complementary signal SCKB from the clock reception circuit 230, and may provide the data clock generation circuit 212 with the system clock signal and the complementary signal, which are driven by driving the system clock signal SCK and the complementary signal SCKB. In an embodiment, the clock reception circuit 230 and the clock buffer circuit 240 may be integrated as components of the clock distribution network 210.

The command address reception circuit 250 may receive a command address signal CA. For example, the command address reception circuit 250 may receive the command address signal CA that is transmitted by the first semiconductor device 110 illustrated in FIG. 1. The command address reception circuit 250 may receive a reference voltage VREF, and may receive the command address signal CA based on the reference voltage VREF. The reference voltage VREF may have a voltage level corresponding to the middle of a voltage range in which the command address signal CA swings. The command address reception circuit 250 may receive the command clock signal CCK that is distributed by the global clock generation circuit 211. The command address reception circuit 250 may synchronize the command address signal CA with the command clock signal CCK by latching the command address signal CA based on the command clock signal CCK. The command address reception circuit 250 may include a command address receiver 251 and a command address latch circuit 252. The command address receiver 251 may receive the command address signal CA and the reference voltage VREF, and may receive the command address signal CA by differentially amplifying the command address signal CA and the reference voltage VREF. The command address latch circuit 252 may latch the received command address signal CA through the command address receiver 251 in synchronization with an edge of the command clock signal CCK. The latched command address signal CA may be provided to another internal circuit of the semiconductor device 200.

The data input/output circuit 260 may receive internal data IND of the semiconductor device 200 and the data clock signal DCK. The data input/output circuit 260 may perform a data input/output operation by transmitting and receiving data DQ in synchronization with the data clock signal DCK. The data input/output circuit 260 may transmit the data DQ by synchronizing the internal data IND with the data clock signal DCK. The data input/output circuit 260 may generate the internal data IND by receiving the data DQ in synchronization with the data clock signal DCK. The data input/output circuit 260 may serialize the internal data IND or de-serialize the data DQ. For example, the data input/output circuit 260 may generate the data DQ by serializing the internal data IND in synchronization with the data clock signal DCK. The data input/output circuit 260 may generate the internal data IND by de-serializing the data DQ in synchronization with the data clock signal DCK. The data input/output circuit 260 may include a serializer that serializes the internal data IND and a de-serializer that de-serializes the data DQ.

Figure 3:
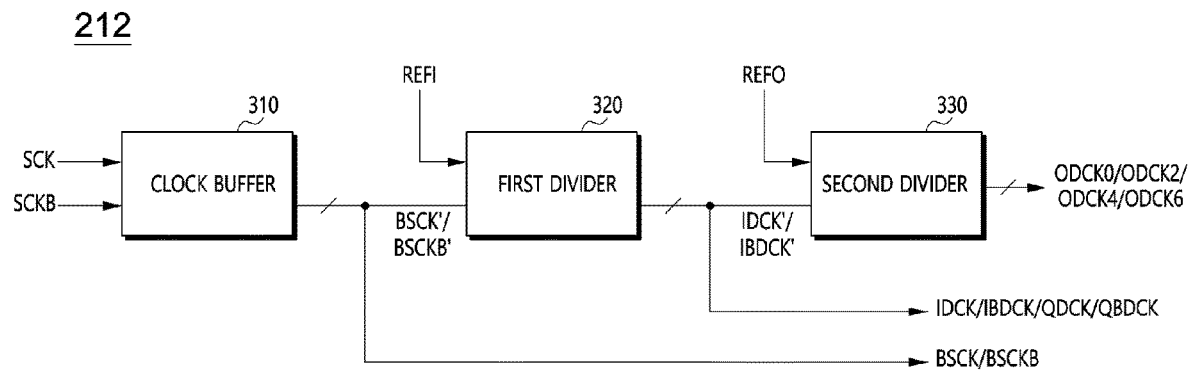
FIG. 3 is a diagram illustrating a configuration of a data clock generation circuit illustrated in FIG. 2.

FIG. 3 is a diagram illustrating a configuration of the data clock generation circuit 212 illustrated in FIG. 2. Referring to FIG. 3, the data clock generation circuit 212 may include a clock buffer 310, a first divider 320, and a second divider 330. The clock buffer 310 may buffer the system clock signal SCK and the complementary signal SCKB, and may generate the buffered system clock signal BSCK and the buffered complementary signal BSCKB. The clock buffer 310 may be coupled to the clock buffer circuit 240 in FIG. 2, and may receive the system clock signal SCK and the complementary signal SCKB that are provided by the clock buffer circuit 240. In an embodiment, the clock buffer 310 may generate a buffered copy system clock signal BSCK' and a buffered copy complementary signal BSCKB' along with the buffered system clock signal BSCK and the buffered complementary signal BSCKB. The buffered copy system clock signal BSCK' may be substantially the same signal as the buffered system clock signal BSCK. The buffered copy complementary signal BSCKB' may be substantially the same signal as the buffered complementary signal BSCKB. The clock buffer 310 may provide the data input/output circuit 260 with the buffered system clock signal BSCK and the buffered complementary signal BSCKB as a part of the data clock signal DCK, and may provide the first divider 320 with the buffered copy system clock signal BSCK' and the buffered copy complementary signal BSCKB'. The clock buffer 310 may generate two pairs of signals having the same characteristics, and can maintain characteristics of a signal and reduce propagation delay by providing the two pairs of signals to different circuits.

The first divider 320 may generate the first group of data clock signals IDCK, QDCK, IBDCK, and QBDCK, based on the first reference clock signal REFI, the buffered copy system clock signal BSCK', and the buffered copy complementary signal BSCKB'. The first divider 320 may be coupled to the clock buffer 310, and may receive the buffered copy system clock signal BSCK' and the buffered copy complementary signal BSCKB' from the clock buffer 310. The first divider 320 may generate the first group of data clock signals IDCK, QDCK, IBDCK, and QBDCK by dividing the first reference clock signal REFI in synchronization with the buffered copy system clock signal BSCK' and the buffered copy complementary signal BSCKB'. The first group of data clock signals may include a first data clock signal IDCK, a second data clock signal QDCK, a third data clock signal IBDCK, and a fourth data clock signal QBDCK. The first to fourth data clock signals IDCK, QDCK, IBDCK, and QBDCK may sequentially have a phase difference of 90 degrees between the first to fourth data clock signals. In an embodiment, the first divider 320 may generate the first group of copy data clock signals IDCK' and IBDCK' along with the first group of data clock signals IDCK, QDCK, IBDCK, and QBDCK. The first group of data clock signals IDCK and IBDCK and the first group of copy data clock signals IDCK' and IBDCK' may be substantially the same signals. The first divider 320 may provide the data input/output circuit 260 with the first group of data clock signals IDCK, QDCK, IBDCK, and QBDCK as a part of the data clock signal DCK, and may provide the second divider 330 with the first group of copy data clock signals IDCK' and IBDCK'. The first group of copy data clock signals may include a fifth data clock signal IDCK' and a sixth data clock signal IBDCK'. The fifth data clock signal IDCK' may be substantially the same signal as the first data clock signal IDCK. The sixth data clock signal IBDCK may be substantially the same signal as the third data clock signal IBDCK. In an embodiment, the first divider 320 may generate substantially the same copy data clock signals as the second data clock signal QDCK and the fourth data clock signal QBDCK, and may provide the copy data clock signals to the second divider 330.

The second divider 330 may generate the second group of data clock signals ODCK0, ODCK2, ODCK4, and ODCK6 based on the second reference clock signal REFO and the first group of copy data clock signals IDCK' and IBDCK'. The second divider 330 may be coupled to the first divider 320, and may receive the first group of copy data clock signals IDCK' and IBDCK' from the first divider 320. The second divider 330 may generate the second group of data clock signals ODCK0, ODCK2, ODCK4, and ODCK6 by dividing the second reference clock signal REFO in synchronization with the first group of copy data clock signals IDCK' and IBDCK'. The second group of data clock signals may include a first data clock signal ODCK0, a second data clock signal ODCK2, a third data clock signal ODCK4, and a fourth data clock signal ODCK6. The first to fourth data clock signals ODCK0, ODCK2, ODCK4, and ODCK6 may sequentially have a phase difference of 90 degrees between the first to fourth data clock signals. The second divider 330 may provide the data input/output circuit 260 with the second group of data clock signals ODCK0, ODCK2, ODCK4, and ODCK6 as a part of the data clock signal DCK. In an embodiment, the data clock generation circuit 212 may be provided for each of the plurality of data input/output circuits. For example, the semiconductor device 200 may include a plurality of data input/output circuits. The number of data clock generation circuits may be substantially the same as the number of data input/output circuits.

Figure 4:
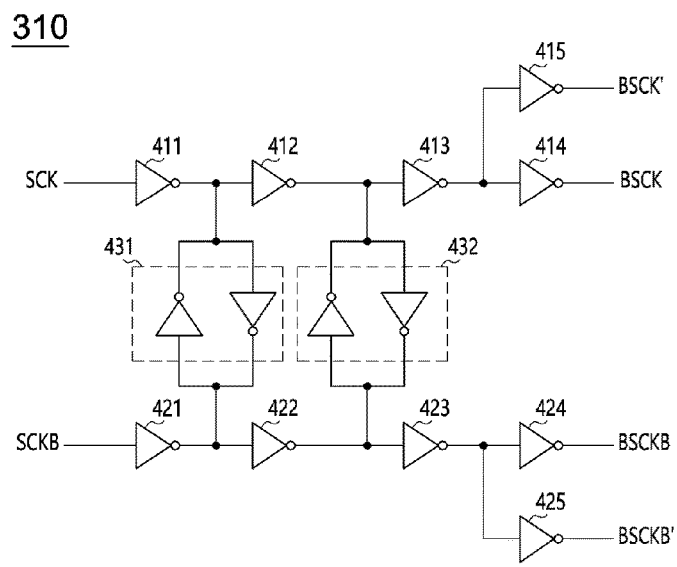
FIG. 4 is a circuit diagram illustrating a configuration of a clock buffer illustrated in FIG. 3.

FIG. 4 is a circuit diagram illustrating a configuration of the clock buffer 310 illustrated in FIG. 3. In FIG. 4, the clock buffer 310 may include a first inverter 411, a second inverter 412, a third inverter 413, a fourth inverter 414, a fifth inverter 415, a sixth inverter 421, a seventh inverter 422, an eighth inverter 423, a ninth inverter 424 and a tenth inverter 425, a first cross-coupled inverter 431, and a second cross-coupled inverter 432. An input terminal of the first inverter 411 may receive the system clock signal SCK. The first inverter 411 may invert and drive the system clock signal SCK. An inverted signal of the first inverter 411 may be output to an output terminal of the first inverter 411. An input terminal of the second inverter 412 may be coupled to the output terminal of the first inverter 411, and may receive the output signal of the first inverter 411. The second inverter 412 may invert and drive the output signal of the first inverter 411. An inverted signal of the second inverter 412 may be output to an output terminal of the second inverter 412. An input terminal of the third inverter 413 may be coupled to the output terminal of the second inverter 412, and may receive the output signal of the second inverter 412. The third inverter 413 may invert and drive the output signal of the second inverter 412. An inverted signal of the third inverter 413 may be output to an output terminal of the third inverter 413. An input terminal of the fourth inverter 414 may be coupled to the output terminal of the third inverter 413, and may receive the output signal of the third inverter 413. The fourth inverter 414 may invert and drive the output signal of the third inverter 413. An inverted signal of the fourth inverter 414 may be output to an output terminal of the fourth inverter 414 as the buffered system clock signal BSCK. An input terminal of the fifth inverter 415 may be coupled to the output terminal of the third inverter 413, and may receive the output signal of the third inverter 413. The fifth inverter 415 may invert and drive the output signal of the third inverter 413. An inverted signal of the fifth inverter 415 may be output to an output terminal of the fifth inverter 415 as the buffered copy system clock signal BSCK'.

An input terminal of the sixth inverter 421 may receive the complementary signal SCKB. The sixth inverter 421 may invert and drive the complementary signal SCKB. An inverted signal of the sixth inverter 421 may be output to an output terminal of the sixth inverter 421. An input terminal of the seventh inverter 422 may be coupled to the output terminal of the sixth inverter 421, and may receive the output signal of the sixth inverter 421. The seventh inverter 422 may invert and drive the output signal of the sixth inverter 421. An inverted signal of the seventh inverter 422 may be output to an output terminal of the seventh inverter 422. An input terminal of the eighth inverter 423 may be coupled to the output terminal of the seventh inverter 422, and may receive the output signal of the seventh inverter 422. The eighth inverter 423 may invert and drive the output signal of the seventh inverter 422. An inverted signal of the eighth inverter 423 may be output to an output terminal of the eighth inverter 423. An input terminal of the ninth inverter 424 may be coupled to the output terminal of the eighth inverter 423, and may receive the output signal of the eighth inverter 423. The ninth inverter 424 may invert and drive the output signal of the eighth inverter 423. An inverted signal of the ninth inverter 424 may be output to an output terminal of the ninth inverter 424 as the buffered complementary signal BSCKB. An input terminal of the tenth inverter 425 may be coupled to the output terminal of the eighth inverter 423, and may receive the output signal of the eighth inverter 423. The tenth inverter 425 may invert and drive the output signal of the eighth inverter 423. An inverted signal of the tenth inverter 425 may be output to an output terminal of the tenth inverter 425 as the buffered copy complementary signal BSCKB'.

The first cross-coupled inverter 431 may couple the output terminal of the first inverter 411 and the output terminal of the sixth inverter 421. The first cross-coupled inverter 431 may maintain characteristics of a signal that is propagated through the clock buffer 310 by latching the voltage levels of the output terminal of the first inverter 411 and the output terminal of the sixth inverter 421. The second cross-coupled inverter 432 may couple the output terminal of the second inverter 412 and the output terminal of the seventh inverter 422. The second cross-coupled inverter 432 may maintain characteristics of a signal that is propagated through the clock buffer 310 by latching the voltage levels of the output terminal of the second inverter 412 and the output terminal of the seventh inverter 422.

Figure 5A:
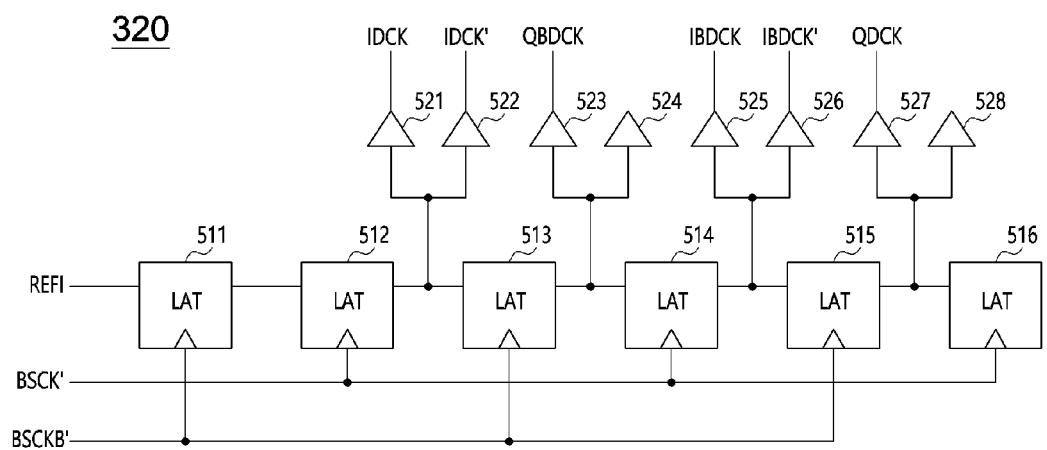
FIG. 5A is a diagram illustrating a configuration of a first divider illustrated in FIG. 3.

FIG. 5A is a diagram illustrating a configuration of the first divider 320 illustrated in FIG. 3. Referring to FIG. 5A, the first divider 320 may include a first latch 511, a second latch 512, a third latch 513, a fourth latch 514, a fifth latch 515, a sixth latch 516, a first buffer 521, a second buffer 522, a third buffer 523, a fourth buffer 524, a fifth buffer 525, a sixth buffer 526, a seventh buffer 527, and an eighth buffer 528. The first to sixth latches 511, 512, 513, 514, 515, and 516 may be sequentially coupled in series. An input terminal of the first latch 511 may receive the first reference clock signal REFI. A clock terminal of the first latch 511 may receive the buffered copy complementary signal BSCKB'. An output terminal of the first latch 511 may be coupled to an input terminal of the second latch 512. The input terminal of the second latch 512 may receive the output signal of the first latch 511. A clock terminal of the second latch 512 may receive the buffered copy system clock signal BSCK'. An output terminal of the second latch 512 may be coupled to an input terminal of the third latch 513. The input terminal of the third latch 513 may receive the output signal of the second latch 512. A clock terminal of the third latch 513 may receive the buffered copy complementary signal BSCKB'. An output terminal of the third latch 513 may be coupled to an input terminal of the fourth latch 514. The input terminal of the fourth latch 514 may receive the output signal of the third latch 513. A clock terminal of the fourth latch 514 may receive the buffered copy system clock signal BSCK'. The output terminal of the fourth latch 514 may be coupled to an input terminal of the fifth latch 515. The input terminal of the fifth latch 515 may receive the output signal of the fourth latch 514. A clock terminal of the fifth latch 515 may receive the buffered copy complementary signal BSCKB'. An output terminal of the fifth latch 515 may be coupled to an input terminal of the sixth latch 516. The input terminal of the sixth latch 516 may receive the output signal of the fifth latch 515. A clock terminal of the sixth latch 516 may receive the buffered copy system clock signal BSCK'. The first buffer 521 may output the first data clock signal IDCK by driving the output signal of the second latch 512. The second buffer 522 may output the fifth data clock signal IDCK' by driving the output signal of the second latch 512. The third buffer 523 may output the fourth data clock signal QBDCK by driving the output signal of the third latch 513. The fourth buffer 524 may drive the output signal of the third latch 513, but may generate or might not generate an output signal. The fourth buffer 524 may be a component that is provided in order to match loads and delay times of nodes from which the first to fourth data clock signals IDCK, QDCK, IBDCK, and QBDCK are generated. The fifth buffer 525 may output the third data clock signal IBDCK by driving the output signal of the fourth latch 514. The sixth buffer 526 may output the sixth data clock signal IBDCK' by inverting and driving the output signal of the fourth latch 514. The seventh buffer 527 may output the second data clock signal QDCK by driving the output signal of the fifth latch 515. The eighth buffer 528 may drive the output signal of the fifth latch 515, but may generate or might not generate an output signal. The eighth buffer 528 may be a component that is provided in order to match loads and delay times of nodes from which the first to fourth data clock signals IDCK, QDCK, IBDCK, and QBDCK are generated.

Figure 5B:
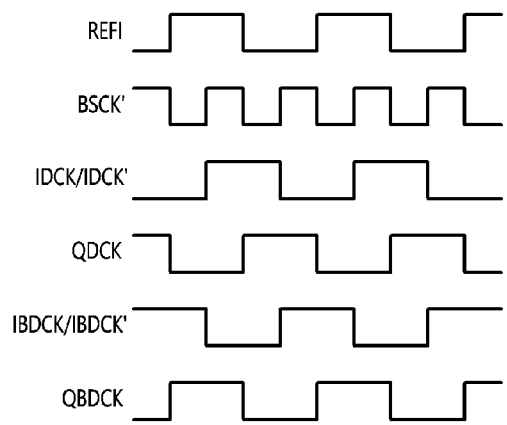
FIG. 5B is a timing diagram illustrating an operation of the first divider illustrated in FIG. 5A.

FIG. 5B is a timing diagram illustrating an operation of the first divider 320 illustrated in FIG. 5A. The first latch 511 of the first divider 320 may latch the logic level of the first reference clock signal REFI in synchronization with a rising edge of the buffered copy complementary signal BSCKB'. The output signal of the first latch 511 may be substantially the same as the first reference clock signal REFI. The second latch 512 may latch the logic level of the output signal of the first latch 511 in synchronization with a rising edge of the buffered copy system clock signal BSCK', and may maintain the latched logic level up to a next rising edge of the buffered copy system clock signal BSCK'. Accordingly, the first data clock signal IDCK and the fifth data clock signal IDCK' that are output through the first and second buffers 521 and 522 may have a high level interval from an odd-numbered rising edge of the buffered copy system clock signal BSCK' to an even-numbered rising edge of the buffered copy system clock signal BSCK'. The third latch 513 may latch the logic level of the output signal of the second latch 512 in synchronization with the rising edge of the buffered copy complementary signal BSCKB' (i.e., a falling edge of the buffered copy system clock signal BSCK'), and may maintain the latched logic level up to a next rising edge of the buffered copy complementary signal BSCKB' (i.e., a next falling edge of the buffered copy system clock signal BSCK'). Accordingly, the fourth data clock signal QBDCK that is output through the third buffer 523 may have a high level interval from an even-numbered falling edge of the buffered copy system clock signal BSCK' to an odd-numbered falling edge of the buffered copy system clock signal BSCK'. The fourth latch 514 may latch the logic level of the output signal of the third latch 513 in synchronization with a rising edge of the buffered copy system clock signal BSCK', and thus may maintain the latched logic level up to a next rising edge of the buffered copy system clock signal BSCK'. Accordingly, the third data clock signal IBDCK and the sixth data clock signal IBDCK' that are output through the fifth and sixth buffers 525 and 526 may have a high level interval from an even-numbered rising edge of the buffered copy system clock signal BSCK' and an odd-numbered rising edge of the buffered copy system clock signal BSCK'. The fifth latch 515 may latch the logic level of the output signal of the fourth latch 514 in synchronization with a rising edge of the buffered copy complementary signal BSCKB' (i.e., a falling edge of the buffered copy system clock signal BSCK'), and may maintain the latched logic level up to a next rising edge of the buffered copy complementary signal BSCKB' (i.e., a next falling edge of the buffered copy system clock signal BSCK'). Accordingly, the second data clock signal QDCK that is output through the seventh buffer 527 may have a high level interval from an odd-numbered falling edge of the buffered copy system clock signal BSCK' to an even-numbered falling edge of the buffered copy system clock signal BSCK'.

Figure 6A:
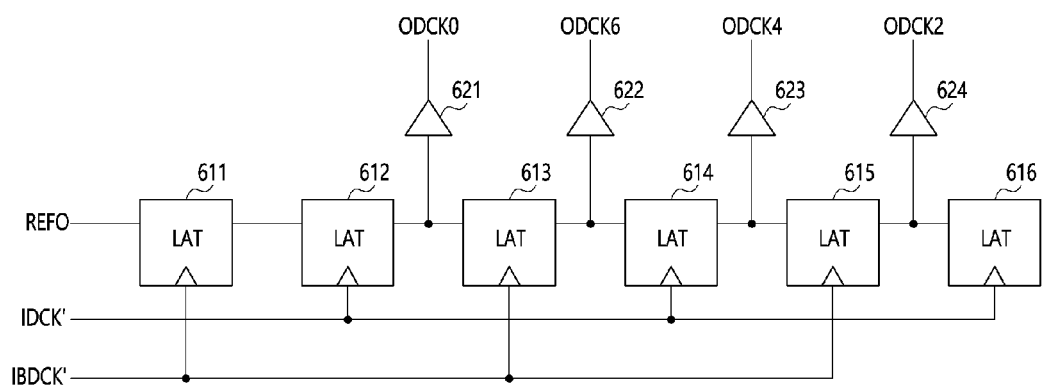
FIG. 6A is a diagram illustrating a configuration of a second divider illustrated in FIG. 4.

FIG. 6A is a diagram illustrating a configuration of the second divider 330 illustrated in FIG. 4. Referring to FIG. 6A, the second divider 330 may include a first latch 611, a second latch 612, a third latch 613, a fourth latch 614, a fifth latch 615, a sixth latch 616, a first buffer 621, a second buffer 622, a third buffer 623, and a fourth buffer 624. The first to sixth latches 611, 612, 613, 614, 615, and 616 may be sequentially coupled in series. An input terminal of the first latch 611 may receive the second reference clock signal REFO. A clock terminal of the first latch 611 may receive the sixth data clock signal IBDCK'. An output terminal of the first latch 611 may be coupled to an input terminal of the second latch 612. The input terminal of the second latch 612 may receive the output signal of the first latch 611. A clock terminal of the second latch 612 may receive the fifth data clock signal IDCK'. An output terminal of the second latch 612 may be coupled to an input terminal of the third latch 613. An input terminal of the third latch 613 may receive the output signal of the second latch 612. A clock terminal of the third latch 613 may receive the sixth data clock signal IBDCK'. An output terminal of the third latch 613 may be coupled to an input terminal of the fourth latch 614. The input terminal of the fourth latch 614 may receive the output signal of the third latch 613. A clock terminal of the fourth latch 614 may receive the fifth data clock signal IDCK'. An output terminal of the fourth latch 614 may be coupled to an input terminal of the fifth latch 615. The input terminal of the fifth latch 615 may receive the output signal of the fourth latch 614. A clock terminal of the fifth latch 615 may receive the sixth data clock signal IBDCK'. An output terminal of the fifth latch 615 may be coupled to an input terminal of the sixth latch 616. The input terminal of the sixth latch 616 may receive the output signal of the fifth latch 615. A clock terminal of the sixth latch 616 may receive the fifth data clock signal IDCK'. The first buffer 621 may output the first data clock signal ODCK0 by driving the output signal of the second latch 612. The second buffer 622 may output the fourth data clock signal QDCK6 by driving the output signal of the third latch 613. The third buffer 623 may output the third data clock signal ODCK4 by driving the output signal of the fourth latch 614. The fourth buffer 624 may output the second data clock signal ODCK2 by driving the output signal of the fifth latch 615.

Figure 6B:
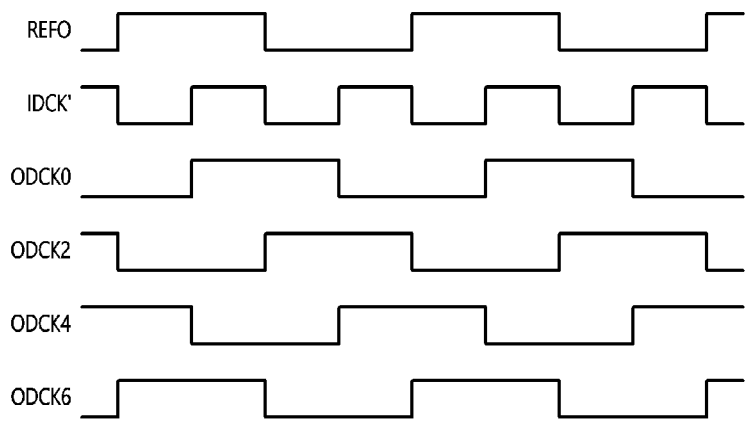
FIG. 6B is a timing diagram illustrating an operation of the second divider illustrated in FIG. 6A.

FIG. 6B is a timing diagram illustrating an operation of the second divider 330 illustrated in FIG. 6A. The first latch 611 of the second divider 330 may latch the logic level of the second reference clock signal REFO in synchronization with a rising edge of the sixth data clock signal IBDCK', so that the output signal of the first latch 611 may be substantially the same as the second reference clock signal REFO. The second latch 612 may latch the logic level of the output signal of the first latch 611 in synchronization with a rising edge of the fifth data clock signal IDCK', and may maintain the latched logic level up to a next rising edge of the fifth data clock signal IDCK'. Accordingly, the first data clock signal ODCK0 that is output through the first buffer 621 may have a high level interval from an odd-numbered rising edge of the fifth data clock signal IDCK' to an even-numbered rising edge of the fifth data clock signal IDCK'. The third latch 613 may latch the logic level of the output signal of the second latch 612 in synchronization with the rising edge of the sixth data clock signal IBDCK' (i.e., a falling edge of the fifth data clock signal IDCK'), and may maintain the latched logic level up to a next rising edge of the sixth data clock signal IBDCK' (i.e., a next falling edge of the fifth data clock signal IDCK'). Accordingly, the fourth data clock signal ODCK6 that is output through the second buffer 622 may have a high level interval from an even-numbered falling edge of the fifth data clock signal IDCK' to an odd-numbered falling edge of the fifth data clock signal IDCK'. The fourth latch 614 may latch the logic level of the output signal of the third latch 613 in synchronization with a rising edge of the fifth data clock signal IDCK', and may maintain the latched logic level up to a next rising edge of the fifth data clock signal IDCK'. Accordingly, the third data clock signal ODCK4 that is output through the third buffer 623 may have a high level interval from an even-numbered rising edge of the fifth data clock signal IDCK' to an odd-numbered rising edge of the fifth data clock signal IDCK'. The fifth latch 615 may latch the logic level of the output signal of the fourth latch 614 in synchronization with a rising edge of the sixth data clock signal IBDCK' (i.e., a falling edge of the fifth data clock signal IDCK'), and may maintain the latched logic level up to a next rising edge of the sixth data clock signal IBDCK' (i.e., a next falling edge of the fifth data clock signal IDCK'). Accordingly, the second data clock signal ODCK2 that is output through the fourth buffer 624 may have a high level interval from an odd-numbered falling edge of the fifth data clock signal IDCK' to an even-numbered falling edge of the fifth data clock signal IDCK'.

Figure 7A:
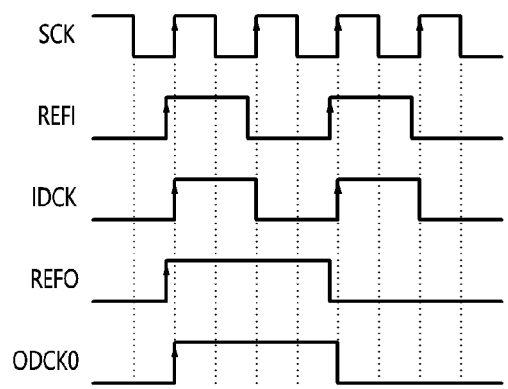
FIGS. 7A to 7D are timing diagrams illustrating the phases of clock signals which may be generated by the clock distribution network according to an embodiment.
Figure 7B:
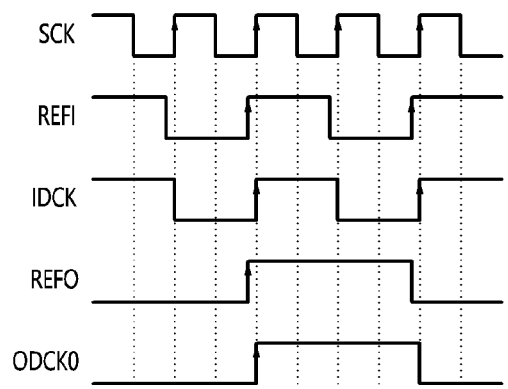
Figure 7C:
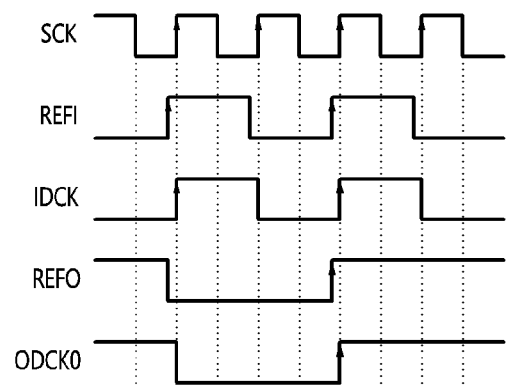
Figure 7D:
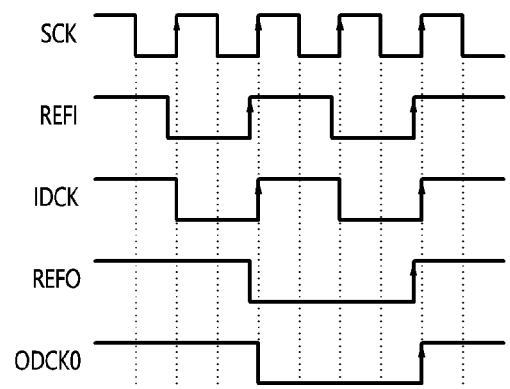

FIGS. 7A to 7D are timing diagrams illustrating the phases of clock signals which may be generated by the clock distribution network 210 according to an embodiment. The clock distribution network 210 according to an embodiment may generate the command clock signal CCK and the data clock signal DCK from the system clock signal SCK, so that both the command clock signal CCK and the data clock signal DCK need to be synchronized with an edge of the system clock signal SCK having the same turn. For example, all of the fifth synchronization clock signal OCCK0 that is included in the command clock signal CCK and the first data clock signal IDCK and the first data clock signal ODCK0 that are included in the data clock signal DCK need to have rising edges that are synchronized with an odd-numbered rising edge of the system clock signal SCK having the same turn. At timing at which the first and second clock division circuits 211-1 and 211-2 that constitute the global clock generation circuit 211 in FIG. 2 become ON or OFF, the phases of the first group of division clock signals VCK1, VCK2, VCK3, and VCK4 that are generated by the first clock division circuit 211-1 may be inverted, or the phases of the second group of division clock signals VVCK1, VVCK2, VVCK3, and VVCK4 that are generated by the second clock division circuit 211-2 may be inverted. If the phases of the clock signals that are generated by the first and second clock division circuits 211-1 and 211-2 are inverted, there may be a problem in that the command clock signal CCK and the data clock signal DCK are not synchronized with the system clock signal SCK normally. FIG. 7A may illustrate a first state (State 1) in which a phase inversion has not occurred in any of the first and second clock division circuits 211-1 and 211-2. Referring to FIG. 7A, because a phase inversion does not occur in the first group of division clock signals VCK1, VCK2, VCK3, and VCK4 and the second group of division clock signals VVCK1, VVCK2, VVCK3, and VVCK4, both the first division clock signal VCK1 and the fifth division clock signal VVCK1 may be synchronized with an odd-numbered rising edge of the system clock signal SCK having the same turn. Accordingly, all of rising edges of the first reference clock signal REFI, the first data clock signal IDCK, the second reference clock signal REFO, and the first data clock signal ODCK0 may be synchronized with an odd-numbered rising edge of the system clock signal SCK having the same turn. FIG. 7B may illustrate a second state (State 2) in which a phase inversion has occurred in the first clock division circuit 211-1. Referring to FIG. 7B, because a phase inversion occurs in the first group of division clock signals VCK1, VCK2, VCK3, and VCK4 and a phase inversion does not occur in the second group of division clock signals VVCK1, VVCK2, VVCK3, and VVCK4, both the first division clock signal VCK1 and the fifth division clock signal VVCK1 may be synchronized with an even-numbered rising edge of the system clock signal SCK having the same turn. Accordingly, all of rising edge of the first reference clock signal REFI, the first data clock signal IDCK, the second reference clock signal REFO, and the first data clock signal ODCK0 may be synchronized with an even-numbered rising edge of the system clock signal SCK having the same turn. FIG. 7C may illustrate a third state (State 3) in which a phase inversion has occurred in the second clock division circuit 211-2. Referring to FIG. 7C, because a phase inversion does not occur in the first group of division clock signals and a phase inversion occurs in the second group of division clock signals, the first division clock signal may be synchronized with the first odd-numbered rising edge of the system clock signal SCK, whereas the fifth division clock signal may be synchronized with the second odd-numbered rising edge of the system clock signal SCK. Accordingly, rising edges of the first reference clock signal REFI and the first data clock signal IDCK may be synchronized with the first odd-numbered rising edge of the system clock signal SCK, but both rising edges of the second reference clock signal REFO and the first data clock signal ODCK0 may be synchronized with the second odd-numbered rising edge of the system clock signal SCK. FIG. 7D may illustrate a fourth state (State 4) in which a phase inversion has occurred in both the first and second clock division circuits 211-1 and 211-2. Referring to FIG. 7D, because a phase inversion occurs in the first group of division clock signals VCK1, VCK2, VCK3, and VCK4 and the second group of division clock signals VVCK1, VVCK2, VVCK3, and VVCK4, the first division clock signal may be synchronized with the first even-numbered rising edge of the system clock signal, whereas the fifth division clock signal may be synchronized with the second even-numbered rising edge of the system clock signal. Accordingly, rising edges of the first reference clock signal REFI and the first data clock signal IDCK may be synchronized with the first even-numbered rising edge of the system clock signal SCK, and both rising edges of the second reference clock signal REFO and the first data clock signal ODCK0 may be synchronized with the second even-numbered rising edge of the system clock signal SCK. The clock distribution network 210 according to an embodiment may detect the second to fourth states through the phase adjustment circuit 213 in FIG. 2, and may perform a phase adjustment operation of changing the second to fourth states like the first state. Rising edges of the first reference clock signal REFI and the first data clock signal IDCK that are generated by the clock distribution network 210 may be synchronized with any one of the first to fourth data clock signals ODCK0, ODCK2, ODCK4, and ODCK6. Accordingly, when any one of the fifth to eighth synchronization clock signals OCCK0, OCCK2, OCCK4, and OCCK6 is detected, if one of the first group of division clock signals VCK1, VCK2, VCK3, and VCK4, which is synchronized with the detected synchronization clock signal, is set as the first reference clock signal REFI and the detected synchronization clock signal is set as the second reference clock signal REFO, all of the first reference clock signal REFI, the first data clock signal IDCK, the second reference clock signal REFO, and the first data clock signal ODCK0 may be synchronized with a rising edge of the system clock signal SCK having the same turn.

Figure 8:
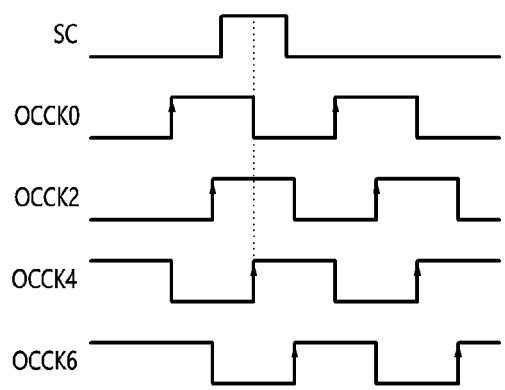
FIG. 8 is a timing diagram illustrating an operation of a phase control circuit illustrated in FIG. 2.

FIG. 8 is a timing diagram illustrating an operation of the phase control circuit 213-1 illustrated in FIG. 2. Referring to FIGS. 2 and 8, the phase control circuit 213-1 may generate the control signal PCON by receiving the synchronization command signal SC and the second group of synchronization clock signals OCCK0, OCCK2, OCCK4, and OCCK6. The phase control circuit 213-1 may detect a clock signal the logic level of which transitions when the synchronization command signal SC is enabled, among the second group of synchronization clock signals OCCK0, OCCK2, OCCK4, and OCCK6. For example, the phase control circuit 213-1 may detect a synchronization clock signal having a rising edge when the synchronization command signal SC is enabled. The synchronization command signal SC may be a signal which may be applied at arbitrary timing, may be generated based on an external signal such as the command address signal CA, and may be an internal control signal which may be generated by another internal circuit of the semiconductor device 200. The phase control circuit 213-1 may detect the synchronization command signal SC based on the fifth to eighth synchronization clock signals OCCK0, OCCK2, OCCK4, and OCCK6. As illustrated in FIG. 8, when a rising edge of the seventh synchronization clock signal OCCK4 occurs, the synchronization command signal SC may be detected. The phase control circuit 213-1 may generate the results of the detection of the seventh synchronization clock signal OCCK4 as the phase control signal 213-1. Likewise, the phase control circuit 213-1 may generate the results of the detection of the fifth, sixth, and eighth synchronization clock signals OCCK0, OCCK2, and OCCK6 as the phase control signal PCON. The phase control signal PCON may include four different control signals, may include a plurality of bits, and may include signals having four different logic values.

Figure 9:
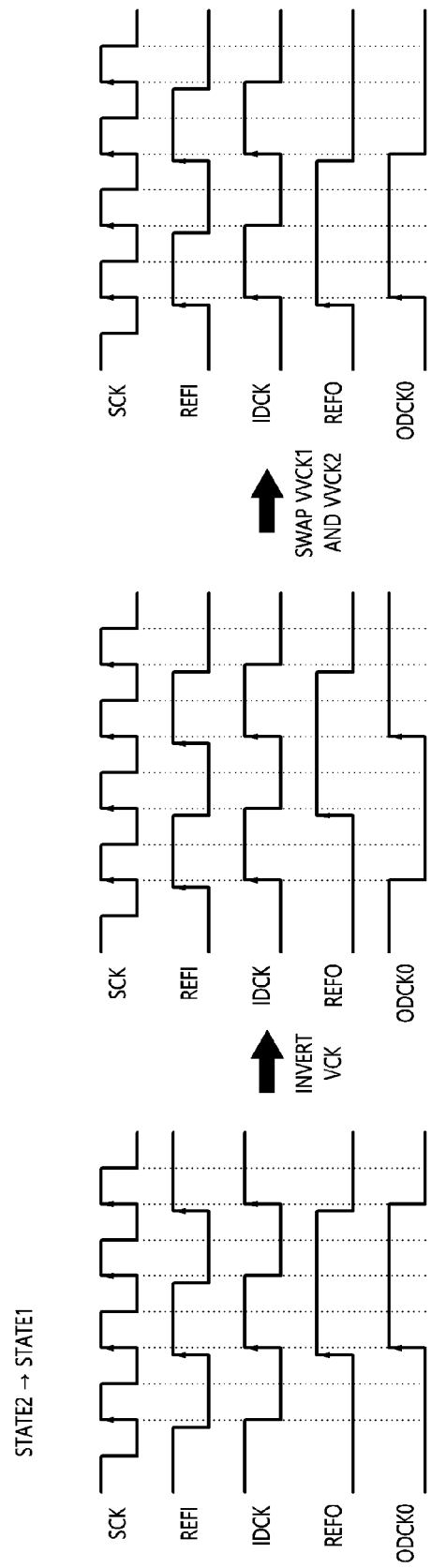
FIG. 9 is a diagram illustrating an operation of a phase adjustment circuit according to an embodiment.

FIG. 9 is a diagram illustrating an operation of the phase adjustment circuit 213 according to an embodiment. FIG. 9 may illustrate a process of changing the second state in FIG. 7B into the first state in FIG. 7A. Referring to FIGS. 2 and 9, when the synchronization command signal SC is enabled, if the phase control circuit 213-1 generates the phase control signal PCON by detecting the sixth synchronization clock signal OCCK2, the phase control signal PCON may indicate an operation for generating one of the first group of division clock signals VCK1, VCK2, VCK3, and VCK4, which is synchronized with the sixth synchronization clock signal OCCK2, as the first reference clock signal REFI and generating the sixth synchronization clock signal OCCK2 as the second reference clock signal REFO. The first phase shifting circuit 213-2 may perform an operation of inverting the phases of the first group of division clock signals VCK1, VCK2, VCK3, and VCK4 based on the phase control signal PCON. By the inversion operation, the third division clock signal VCK3 may be output as the first synchronization clock signal ICCK, the fourth division clock signal VCK4 may be output as the second synchronization clock signal QCCK, the first division clock signal VCK1 may be output as the third synchronization clock signal IBCCK, and the second division clock signal VCK2 may be output as the fourth synchronization clock signal QBCCK. When the third division clock signal VCK3 is output as the first synchronization clock signal ICCK, both the first reference clock signal REFI and the first data clock signal IDCK may have rising edges that are synchronized with a rising edge of the third division clock signal VCK3. The second phase shifting circuit 213-3 may perform an operation of swapping the phases of the second group of division clock signals VVCK1, VVCK2, VVCK3, and VVCK4 based on the phase control signal PCON. The second phase shifting circuit 213-3 may perform an operation of swapping the phase of the fifth division clock signal VVCK1 for the phase of the sixth division clock signal VVCK2. By the swap operation, the sixth division clock signal VVCK2 may be output as the fifth synchronization clock signal OCCK0, the seventh division clock signal VVCK3 may be output as the sixth synchronization clock signal OCCK2, the eighth division clock signal VVCK4 may be output as the seventh synchronization clock signal OCCK4, and the fifth division clock signal VVCK1 may be output as the eighth synchronization clock signal OCCK6. Accordingly, the second reference clock signal REFO may be synchronized with the phase of the sixth division clock signal VVCK2. All of the first reference clock signal REFI, the first data clock signal IDCK, the second reference clock signal REFO, and the first data clock signal ODCK0 may be arranged with an odd-numbered rising edge of the system clock signal SCK having the same turn.

Figure 10:
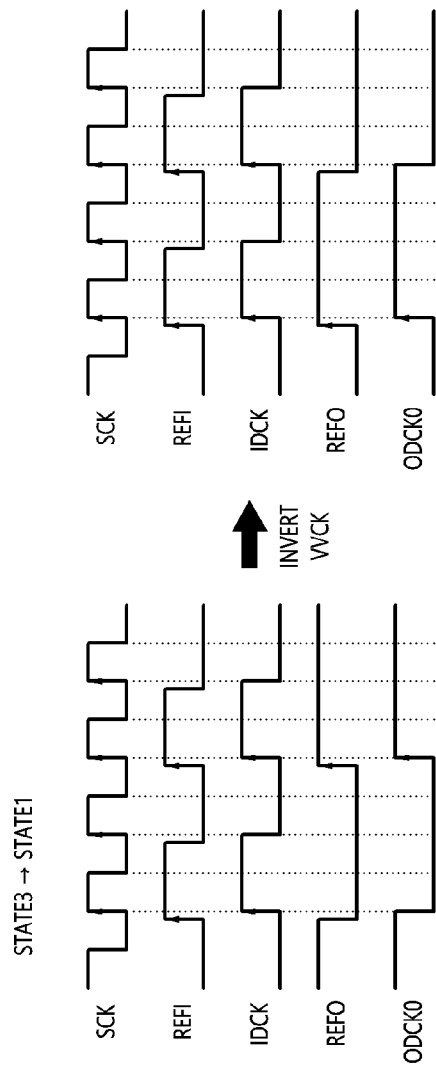
FIG. 10 is a diagram illustrating an operation of the phase adjustment circuit according to an embodiment.

FIG. 10 is a diagram illustrating an operation of the phase adjustment circuit 213 according to an embodiment. FIG. 10 may illustrate a process of changing the third state in FIG. 7C into the first state in FIG. 7A. Referring to FIGS. 2 and 10, when the synchronization command signal SC is enabled, if the phase control circuit 213-1 generates the phase control signal PCON by detecting the seventh synchronization clock signal OCCK4, the phase control signal PCON may indicate an operation for generating one of the first group of division clock signals VCK1, VCK2, VCK3, and VCK4, which is synchronized with the seventh synchronization clock signal OCCK4, as the first reference clock signal REFI and generating the seventh synchronization clock signal OCCK4 as the second reference clock signal REFO. The first phase shifting circuit 213-2 might not perform an operation of inverting or swapping the phases of the first group of division clock signals based on the phase control signal PCON. Accordingly, the first division clock signal VCK1 may be output as the first synchronization clock signal ICCK, the second division clock signal VCK2 may be output as the second synchronization clock signal QCCK, the third division clock signal VCK3 may be output as the third synchronization clock signal IBCCK, and the fourth division clock signal VCK4 may be output as the fourth synchronization clock signal QBCCK. When the first division clock signal VCK1 is output as the first synchronization clock signal ICCK, both the first reference clock signal REFI and the first data clock signal IDCK may have rising edges that are synchronized with a rising edge of the first division clock signal VCK1. The second phase shifting circuit 213-3 may perform an operation of inverting the phases of the second group of division clock signals VVCK1, VVCK2, VVCK3, and VVCK4 based on the phase control signal PCON. By the inversion operation, the seventh division clock signal VVCK3 may be output as the fifth synchronization clock signal OCCK0, the eighth division clock signal VVCK4 may be output as the sixth synchronization clock signal OCCK2, the fifth division clock signal VCCK1 may be output as the seventh synchronization clock signal OCCK4, and the sixth division clock signal VCCK2 may be output as the eighth synchronization clock signal OCCK6. Accordingly, the second reference clock signal REFO may be synchronized with the phase of the seventh division clock signal VVCK3. All of the first reference clock signal REFI, the first data clock signal IDCK, the second reference clock signal REFO, and the first data clock signal ODCK0 may be arranged with an odd-numbered rising edge of the system clock signal SCK having the same turn.

Figure 11:
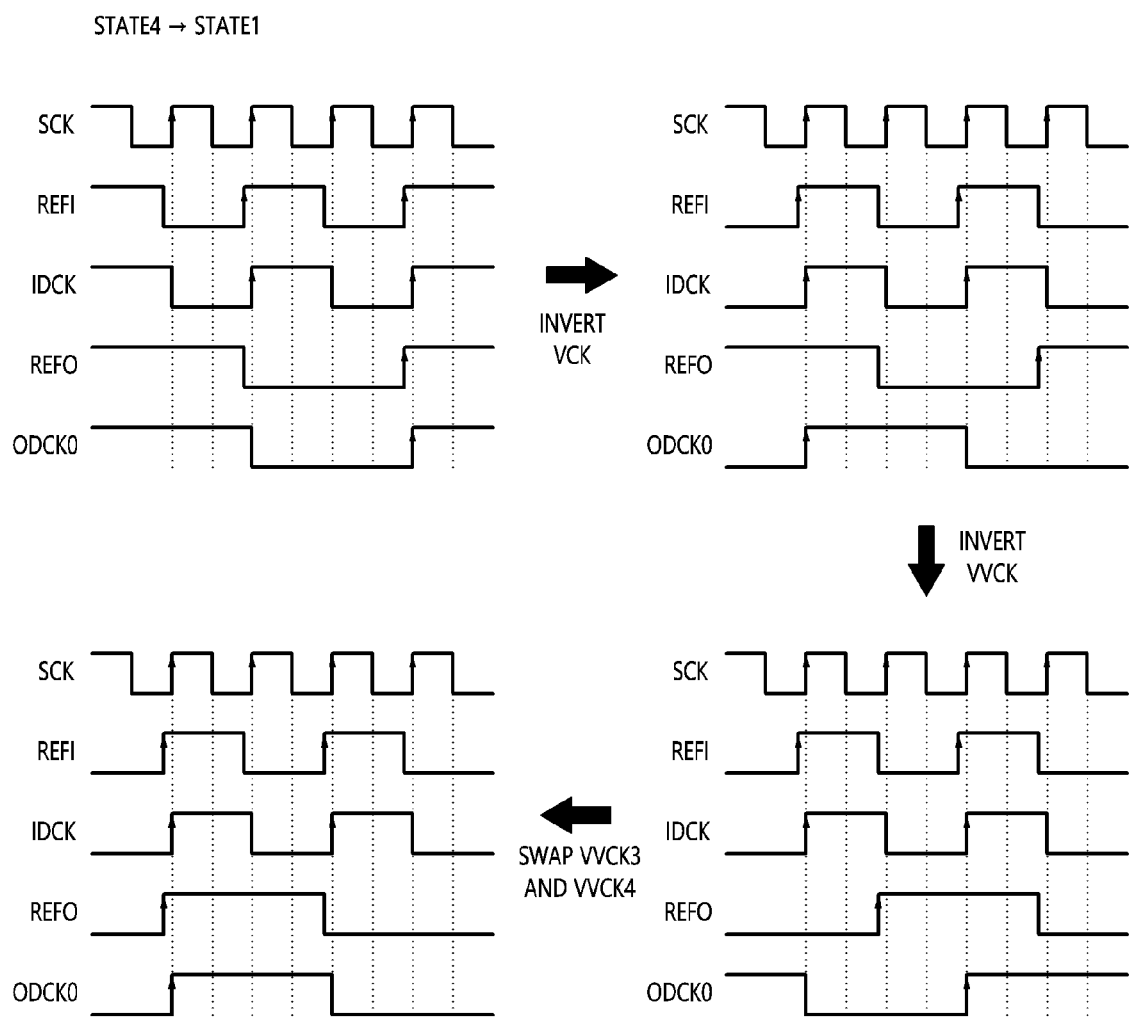
FIG. 11 is a diagram illustrating an operation of the phase adjustment circuit according to an embodiment.

FIG. 11 is a diagram illustrating an operation of the phase adjustment circuit 213 according to an embodiment. FIG. 11 may illustrate a process of changing the fourth state in FIG. 7D into the first state in FIG. 7A. Referring to FIGS. 2 and 11, when the synchronization command signal SC is enabled, if the phase control circuit 213-1 generates the phase control signal PCON by detecting the eighth synchronization clock signal OCCK6, the phase control signal PCON may indicate an operation for generating one of the first group of division clock signals VCK1, VCK2, VCK3, and VCK4, which is synchronized with the eighth synchronization clock signal OCCK6, as the first reference clock signal REFI and generating the eighth synchronization clock signal OCCK6 as the second reference clock signal REFO. First, the first phase shifting circuit 213-2 may perform an operation of inverting the phases of the first group of division clock signals VCK1, VCK2, VCK3, and VCK4 based on the phase control signal PCON. By the inversion operation, the third division clock signal VCK3 may be output as the first synchronization clock signal ICCK, the fourth division clock signal VCK4 may be output as the second synchronization clock signal QCCK, the first division clock signal VCK1 may be output as the third synchronization clock signal IBCCK, and the second division clock signal VCK2 may be output as the fourth synchronization clock signal QBCCK. When the third division clock signal VCK3 is output as the first synchronization clock signal ICCK, both the first reference clock signal REFI and the first data clock signal IDCK may have rising edges that are synchronized with a rising edge of the first division clock signal VCK1. Next, the second phase shifting circuit 213-3 may perform an operation of inverting the phases of the second group of division clock signals VVCK1, VVCK2, VVCK3, and VVCK4 based on the phase control signal PCON. By the inversion operation, the seventh division clock signal VVCK3 may be output as the fifth synchronization clock signal OCCK0, the eighth division clock signal VVCK4 may be output as the sixth synchronization clock signal OCCK2, the fifth division clock signal VVCK1 may be output as the seventh synchronization clock signal OCCK4, and the sixth division clock signal VVCK2 may be output as the eighth synchronization clock signal OCCK6. The second reference clock signal REFO may be synchronized with the phase of the seventh division clock signal VVCK3, and the first reference clock signal REFI and the first data clock signal IDCK may be arranged with an odd-numbered rising edge of the system clock signal SCK having the same turn. However, the second reference clock signal REFO and the first data clock signal ODCK0 may be arranged with an even-numbered rising edge of the system clock signal SCK having the same turn. Finally, the second phase shifting circuit 213-3 may perform an operation of swapping the phases of the second group of division clock signals VVCK1, VVCK2, VVCK3, and VVCK4 based on the phase control signal PCON. The second phase shifting circuit 213-3 may perform an operation of swapping the phase of the seventh division clock signal VVCK3 and the phase of the eighth division clock signal VVCK4. By the swap operation, the eighth division clock signal VVCK4 may be output as the fifth synchronization clock signal OCCK0, the fifth division clock signal VVCK1 may be output as the sixth synchronization clock signal OCCK2, the sixth division clock signal VVCK2 may be output as the seventh synchronization clock signal OCCK4, and the seventh division clock signal VVCK3 may be output as the eighth synchronization clock signal OCCK6. The second reference clock signal REFO may be synchronized with the eighth synchronization clock signal OCCK6, and all of the first reference clock signal REFI, the first data clock signal IDCK, the second reference clock signal REFO, and the first data clock signal ODCK0 may be arranged with an odd-numbered rising edge of the system clock signal SCK having the same turn.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A clock distribution network comprising:
a global clock generation circuit configured to divide a system clock signal to generate a first group of division clock signals, and to divide at least some of the first group of division clock signals to generate a second group of division clock signals; and
a data clock generation circuit configured to generate a first group of data clock signals based on at least some of the first group of division clock signals and the system clock signal, and to generate a second group of data clock signals based on at least some of the second group of division clock signals and at least some of the first group of data clock signals.

2. The clock distribution network according to claim 1, wherein:
the first group of data clock signals have a lower frequency than the system clock signal, and
the second group of data clock signals have a lower frequency than the first group of data clock signals.

3. The clock distribution network according to claim 1, wherein the data clock generation circuit comprises:
a clock buffer configured to generate a buffered system clock signal by buffering the system clock signal;
a first divider configured to generate the first group of data clock signals by latching logic levels of at least some of the first group of division clock signals in synchronization with an edge of the buffered system clock signal; and
a second divider configured to generate the second group of data clock signals by latching logic levels of at least some of the second group of division clock signals in synchronization with edges of at least some of the first group of data clock signals.

4. A semiconductor device comprising:
a global clock generation circuit configured to divide a system clock signal to generate a first group of division clock signals, and to divide at least some of the first group of division clock signals to generate a second group of division clock signals;
a command address reception circuit configured to receive a command address signal and to latch the command address signal based on a command clock signal that is generated based on the second group of division clock signals; and
a data clock generation circuit configured to generate a first group of data clock signals based on at least some of the first group of division clock signals and the system clock signal, and to generate a second group of data clock signals based on at least some of the second group of division clock signals and at least some of the first group of data clock signals.

5. The semiconductor device according to claim 4, wherein:
the first group of data clock signals have a lower frequency than the system clock signal, and
the second group of data clock signals have a lower frequency than each of the first group of data clock signals.

6. The semiconductor device according to claim 4, wherein the command address reception circuit comprises:
a command address receiver configured to receive the command address signal; and
a command address latch circuit configured to latch the command address signal received by the command address receiver, in synchronization with the command clock signal.

7. The semiconductor device according to claim 4, wherein the data clock generation circuit comprises:
a clock buffer configured to generate a buffered system clock signal and a buffered copy system clock signal by buffering the system clock signal;
a first divider configured to generate the first group of data clock signals and a first group of copy data clock signals by latching logic levels of at least some of the first group of division clock signals in synchronization with an edge of the buffered copy system clock signal; and
a second divider configured to generate the second group of data clock signals by latching logic levels of at least some of the second group of division clock signals in synchronization with edges of the first group of copy data clock signals.

8. The semiconductor device according to claim 7, further comprising a data input and output (input/output) circuit configured to transmit and receive data based on the buffered system clock signal, the first group of data clock signals, and the second group of data clock signals.

9. A semiconductor device comprising a clock distribution network, wherein the clock distribution network comprises:
a global clock generation circuit configured to divide a system clock signal to generate a first group of division clock signals, and to divide at least some of the first group of division clock signals to generate a second group of division clock signals;
a phase adjustment circuit configured to generate one of the first group of division clock signals as a first reference clock signal and generate one of the second group of division clock signals as a second reference clock signal, by detecting phases of the second group of division clock signals; and
a data clock generation circuit configured to generate a first group of data clock signals based on the first reference clock signal and the system clock signal and to generate a second group of data clock signals based on the second reference clock signal and at least some of the first group of data clock signals.

10. The semiconductor device according to claim 9, wherein the phase adjustment circuit
generates a first group of synchronization clock signals by inverting or swapping phases of the first group of division clock signals based on results of the detection of the phases of the second group of division clock signals,
generates a second group of synchronization clock signals by inverting or swapping the phases of the second group of division clock signals,
outputs one of the first group of synchronization clock signals as the first reference clock signal, and
outputs one of the second group of synchronization clock signals as the second reference clock signal.

11. The semiconductor device according to claim 9, wherein:
the first group of division clock signals comprises first to fourth division clock signals that have a phase difference of substantially ninety degrees,
the second group of division clock signals comprises fifth to eighth division clock signals that have a phase difference of substantially ninety degrees, and
the phase adjustment circuit provides the first division clock signal as the first reference clock signal and provides the fifth division clock signal as the second reference clock signal, when rising edges of the first division clock signal and the fifth division clock signal are synchronized with the same odd-numbered rising edge of the system clock signal.

12. The semiconductor device according to claim 9, wherein:
the first group of division clock signals comprises first to fourth division clock signals that have a phase difference of substantially ninety degrees,
the second group of division clock signals comprises fifth to eighth division clock signals that have a phase difference of substantially ninety degrees between the fifth to eighth division clock signals, and
the phase adjustment circuit provides the third division clock signal as the first reference clock signal and provides the sixth division clock signal as the second reference clock signal, when rising edges of the first division clock signal and the fifth division clock signal are synchronized with the same even-numbered rising edge of the system clock signal.

13. The semiconductor device according to claim 9, wherein:
the first group of division clock signals comprises first to fourth division clock signals that have a phase difference of substantially ninety degrees,
the second group of division clock signals comprises fifth to eighth division clock signals that have a phase difference of substantially ninety degrees, and
the phase adjustment circuit provides the first division clock signal as the first reference clock signal and provides the seventh division clock signal as the second reference clock signal, when rising edges of the first division clock signal and the fifth division clock signal are synchronized with different odd-numbered rising edges of the system clock signal.

14. The semiconductor device according to claim 9, wherein:
the first group of division clock signals comprises first to fourth division clock signals that have a phase difference of substantially ninety degrees,
the second group of division clock signals comprises fifth to eighth division clock signals that have a phase difference of substantially ninety degrees, and
the phase adjustment circuit provides the third division clock signal as the first reference clock signal and provides the eighth division clock signal as the second reference clock signal, when rising edges of the first division clock signal and the fifth division clock signal are synchronized with different even-numbered rising edges of the system clock signal.

15. The semiconductor device according to claim 9, wherein the phase adjustment circuit comprises:
a phase control circuit configured to generate a phase control signal by detecting the phases of the second group of division clock signals;
a first phase shifting circuit configured to generate a first group of synchronization clock signals by inverting or swapping phases of the first group of division clock signals based on the phase control signal;
a second phase shifting circuit configured to generate a second group of synchronization clock signals by inverting or swapping the phases of the second group of division clock signals based on the phase control signal;
a first reference clock generation circuit configured to output one of the first group of synchronization clock signals as the first reference clock signal; and
a second reference clock generation circuit configured to output one of the second group of synchronization clock signals as the second reference clock signal.

16. The semiconductor device according to claim 15, wherein:
the second group of synchronization clock signals is provided as a command clock signal, and
the semiconductor device further comprises a command address reception circuit configured to receive the command address signal and to latch the command address signal based on the command clock signal.

17. The semiconductor device according to claim 9, wherein the data clock generation circuit comprises:
a clock buffer configured to generate a buffered system clock signal and a buffered copy system clock signal by buffering the system clock signal;
a first divider configured to generate the first group of data clock signals and a first group of copy data clock signals by latching a logic level of the first reference clock signal in synchronization with an edge of the buffered copy system clock signal; and
a second divider configured to generate the second group of data clock signals by latching a logic level of the second reference clock signal in synchronization with edges of the first group of copy data clock signals.

18. The semiconductor device according to claim 17, further comprising a data input and output (input/output) circuit configured to transmit and receive data in synchronization with the buffered system clock signal, the first group of data clock signals, and the second group of data clock signals.

\* \* \* \* \*